US012799379B2

(12) United States Patent
Itoh et al.

(10) Patent No.: US 12,799,379 B2
(45) Date of Patent: Nov. 17, 2026

(54) PRESSURE SENSITIVE ADHESIVE LAYER-FORMING ORGANOPOLYSILOXANE COMPOSITION, USE OF SAME, AND COMPOSITION DESIGN METHOD FOR SAME

(71) Applicant: DOW TORAY CO., LTD., Tokyo (JP)

(72) Inventors: Maki Itoh, Ichihara (JP); Akihiro Nakamura, Ichihara (JP); Michitaka Suto, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 659 days.

(21) Appl. No.: 18/268,979

(22) PCT Filed: Dec. 24, 2021

(86) PCT No.: PCT/JP2021/048182

§ 371 (c)(1),
(2) Date: Aug. 23, 2023

(87) PCT Pub. No.: WO2022/138913

PCT Pub. Date: Jun. 30, 2022

(65) Prior Publication Data

US 2024/0117231 A1 Apr. 11, 2024

(30) Foreign Application Priority Data

Dec. 25, 2020 (JP) ................................ 2020-216895

(51) Int. Cl.
*C09J 7/38* (2018.01)
*C09J 7/40* (2018.01)
*C09J 183/06* (2006.01)

(52) U.S. Cl.
CPC ............... *C09J 183/06* (2013.01); *C09J 7/38* (2018.01); *C09J 7/403* (2018.01); *C09J 2203/326* (2013.01); *C09J 2301/12* (2020.08); *C09J 2301/302* (2020.08); *C09J 2301/312* (2020.08); *C09J 2301/50* (2020.08); *Y10T 428/2878* (2015.01)

(58) Field of Classification Search
None
See application file for complete search history.

(56) References Cited

U.S. PATENT DOCUMENTS 12,134,697 B2 * 11/2024 Yamazaki ............... C08L 83/04
12,503,630 B2 * 12/2025 Itoh ............................ C09J 7/10
2012/0045629 A1 * 2/2012 Greer ................ B32B 17/10036 528/31
2019/0134946 A1 5/2019 Choi et al.
2019/0203077 A1 7/2019 Park et al.
2019/0233682 A1 8/2019 Park et al.
2020/0208032 A1 * 7/2020 Han .......................... C09J 7/30
2021/0269691 A1 9/2021 Itoh et al.
2021/0284888 A1 9/2021 Itoh et al.
2021/0292607 A1 9/2021 Itoh et al.
2022/0224069 A1 * 7/2022 Wang ...................... H01S 3/005
2022/0275251 A1 * 9/2022 Itoh ............................ C09J 7/10
2022/0275262 A1 * 9/2022 Itoh ........................ C09J 183/04
2022/0282141 A1 9/2022 Itoh et al.

FOREIGN PATENT DOCUMENTS

JP 2019527745 A 10/2019
JP 2019528330 A 10/2019
WO 2017188308 A1 11/2017
WO 2020032285 A1 2/2020
WO 2020032286 A1 2/2020
WO 2020032287 A1 2/2020
WO 2021029412 A1 2/2021
WO 2021029413 A1 2/2021
WO 2021029414 A1 2/2021

OTHER PUBLICATIONS

English translation of International Search Report for PCT/JP2021/048182 dated Mar. 15, 2022, 2 pages.

* cited by examiner

*Primary Examiner* — Anish P Desai
(74) *Attorney, Agent, or Firm* — Warner Norcross + Judd LLP

(57) ABSTRACT

The pressure-sensitive adhesive layer forming organopolysiloxane composition of this disclosure is hydrosilylation reaction curable, wherein 1 mass % or more of a resin component is (b2) an organopolysiloxane resin having a weight average molecular weight (Mw) as measured in terms of standard polystyrene by GPC using toluene that is less than 4000, and the value obtained by dividing Tg+120(° C.) of the pressure-sensitive adhesive layer obtained by curing by Tg'+120(° C.) of the composition (pressure-sensitive adhesive layer), in which component (b2) is substituted by a resin with Mw 4000 or higher is less than 1.0. When used as a pressure-sensitive adhesive layer and when a specific resin component/polymer component ratio is selected to achieve a pressure-sensitive adhesive strength, the glass transition temperature (Tg) of the pressure-sensitive adhesive layer can be further reduced, resulting in a strong pressure-sensitive adhesive force and a low Tg at the same time.

15 Claims, 1 Drawing Sheet

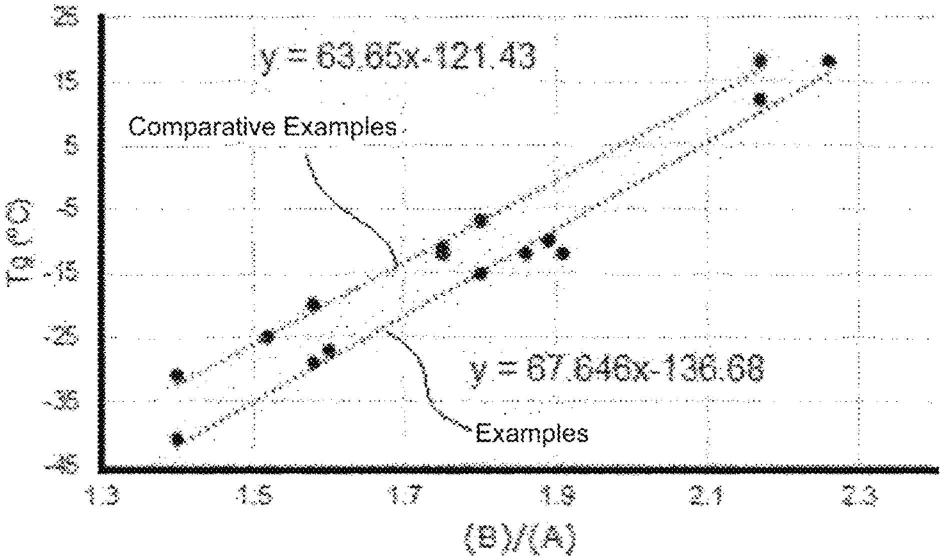
y = 63.65x-121.43
Comparative Examples
y = 67.646x-136.68
Examples
Tg (°C)
25
15
5
-5
-15
-25
-35
-45
1.3
1.5
1.7
1.9
2.1
2.3
(B)/(A)

PRESSURE SENSITIVE ADHESIVE LAYER-FORMING ORGANOPOLYSILOXANE COMPOSITION, USE OF SAME, AND COMPOSITION DESIGN METHOD FOR SAME

CROSS-REFERENCE TO RELATED APPLICATIONS

This application is the U.S. National Stage of International Application No. PCT/US2021/048182 filed on 24 Dec. 2021, which claims priority to, and all advantages of Japanese Patent Application No. 2020-216895 filed on 25 Dec. 2020, the content of which is incorporated herein by reference.

TECHNICAL FIELD

The present invention relates to a curing reactive organopolysiloxane composition that forms a pressure-sensitive adhesive layer. The present invention particularly relates to: a curing reactive organopolysiloxane composition in which curability is sufficient for practical use and the glass transition point (Tg) of a pressure-sensitive adhesive layer thereof is significantly reduced when the same resin component/polymer component ratio is employed, and that provides a stronger pressure-sensitive adhesive force; and a composition design method thereof. Furthermore, the present invention relates to a pressure-sensitive adhesive composition that uses the composition, along with applications such as laminate bodies, electronic parts, or display devices (including flexible displays, touch panels, and the like) that use the composition.

BACKGROUND ART

Silicone-based pressure-sensitive adhesive compositions are superior to acrylic and rubber pressure-sensitive adhesive compositions in electrical insulation, heat resistance, cold resistance, pressure-sensitive adhesion to various adherends, and transparency if necessary; therefore, the addition reaction curing type pressure-sensitive adhesive compositions in particular are widely used. Particularly in recent years, the demand for silicone-based optically transparent pressure-sensitive adhesives (Optically Clear Adhesive, hereinafter referred to as “OCA”) has expanded in material development. Silicone-based OCAs have sufficient pressure-sensitive adhesive strength for practical use, are flexible and deformable, have excellent heat, cold, and light resistance, do not cause coloring or discoloration problems in an OCA layer, and have little change in physical properties such as pressure-sensitive adhesive strength, storage elastic modulus (e.g., shear storage elastic modulus G'), hardness, and the like of the OCA layer. Therefore, applications are expected to be developed for laminating or sealing display devices that are subject to folding or constant deformation, such as curved surface displays and flexible displays used in a wide range of temperatures, including low temperatures such as −20° C. and the like (for example, Patent Documents 1 and 2. Furthermore, the applicants in the present case have proposed a plurality of silicone pressure-sensitive adhesive compositions with different pressure-sensitive adhesive strengths of flexible structures, pressure-sensitive adhesive layers obtained by curing, and storage elastic modulus at low temperature to room temperature, according to the applications such as display devices and the like (Patent Documents 3 to 9).

On the other hand, in the field of flexible displays that are repeatedly bent or folded, strong pressure-sensitive adhesive strength is required for the pressure-sensitive adhesive layer obtained by curing in order to prevent failure or reduced reliability due to delamination between layers and the like. Meanwhile, there is a growing demand for OCA layers with lower glass transition temperatures (Tg) that do not easily change in physical properties such as storage elastic modulus (e.g., shear storage elastic modulus G'), hardness, and the like even at low temperatures. However, the pressure-sensitive adhesive strength and Tg of the pressure-sensitive adhesive layer obtained by curing the silicone-based pressure-sensitive adhesive composition are largely determined by the ratio of a resin component/polymer component thereof, making it difficult to achieve both stronger pressure-sensitive adhesive strength and lower Tg.

PRIOR ART DOCUMENTS

Patent Documents

[Patent Document 1] Japanese PCT Application 2019-528330
[Patent Document 2] Japanese PCT Application 2019-527745
[Patent Document 3] International Patent Publication WO 2017/188308
[Patent Document 4] International Patent Publication WO 2020/032285
[Patent Document 5] International Patent Publication WO 2020/032286
[Patent Document 6] International Patent Publication WO 2020/032287
[Patent Document 7] International Patent Application PCT/JP2020/30623
[Patent Document 8] International Patent Application PCT/JP2020/30624
[Patent Document 9] International Patent Application PCT/JP2020/30625

SUMMARY OF THE INVENTION

Problem to be Solved by the Invention

In view of the foregoing, an object of the present invention is to provide: a pressure-sensitive adhesive layer forming organopolysiloxane composition in which the glass transition temperature (Tg) of the pressure-sensitive adhesive layer can be further reduced when a specific resin component/polymer component ratio is selected to achieve a pressure-sensitive adhesive strength when used as a pressure-sensitive adhesive layer, resulting in a strong pressure-sensitive adhesive force and a low glass transition temperature (Tg) at the same time; a use of same; and a composition design method of same.

Means for Solving the Problem

As a result of conducting diligent research on the problem described above, the present inventors arrived at the present invention. In other words, one object of the present invention is achieved by a pressure-sensitive adhesive layer forming organopolysiloxane composition, containing:

(A) a chain organopolysiloxane having one or more alkenyl groups on average in a molecule;

(B) an organopolysiloxane containing the following components (b1) and (b2) at a mass ratio of 1:99 to 0:100, or a mixture thereof:

(b1) an organopolysiloxane resin, where the total amount of hydroxyl groups and hydrolyzable groups with regard to all silicon atoms in a molecule is 9 mol % or less, and the weight average molecular weight (Mw) measured in terms of standard polystyrene by gel permeation chromatography (GPC) using toluene is 5500 or more, and (b2) an organopolysiloxane resin, where the total amount of hydroxyl groups and hydrolyzable groups with regard to all silicon atoms in a molecule is 9 mol % or less, and the weight average molecular weight (Mw) measured in terms of standard polystyrene by gel permeation chromatography (GPC) using toluene is less than 4000;

(C) an organohydrogenpolysiloxane having at least two Si—H bonds in a molecule; and (D) an effective amount of a hydrosilylation reaction catalyst, wherein the value of [Tg+120]/[Tg'+120] is less than 1.0, when Tg (° C.) represents the glass transition temperature of a pressure-sensitive adhesive layer obtained by curing the composition, and Tg' (° C.) represents the glass transition temperature of a pressure-sensitive adhesive layer obtained by curing a composition in which component (b2) is substituted with an organopolysiloxane resin with a weight average molecular weight (Mw) of 4000 or more, measured by the same method as component (b2), and the mass ratio of component (B) component to component (A) is the same.

Furthermore, the problem described above can be solved through the use of the pressure-sensitive adhesive layer forming organopolysiloxane composition or a cured product thereof as a pressure-sensitive adhesive layer, the use of the same as an electronic material or a member for a display device, and an electronic part or a display device provided with the same.

Furthermore, the problem above can be solved by a composition design method for a pressure-sensitive adhesive layer forming organopolysiloxane composition characterized by the use of the aforementioned component (b2) in the range of 1 to 100% by mass of the organopolysiloxane resin or mixture thereof, when a specific resin component/polymer component mass ratio is selected.

Effect of the Invention

The pressure-sensitive adhesive layer forming organopolysiloxane composition of the present invention has excellent curability by a hydrosilylation reaction, and when used as a pressure-sensitive adhesive layer and when a specific resin component/polymer component ratio is selected to achieve a pressure-sensitive adhesive strength, the glass transition temperature (Tg) of the pressure-sensitive adhesive layer can be further reduced, resulting in a strong pressure-sensitive adhesive force and a low glass transition temperature (Tg) at the same time. Furthermore, the organopolysiloxane composition of the present invention or a mixture thereof can be suitably used as a pressure-sensitive adhesive layer, an electronic material, or a member for a display device having both a strong pressure-sensitive adhesive strength and a low Tg. Electrical or electronic part or a display device provided with the organopolysiloxane composition or mixture thereof can form a pressure-sensitive adhesive layer that does not cause close adhesion problems to a substrate of an electronic part and the like in a temperature region including from a low temperature to room temperature, as the adhesive layer has sufficient a pressure-sensitive adhesive strength and viscoelastic properties over a wide range of temperatures including low temperatures, and thus the organopolysiloxane composition of the present invention or mixture thereof has the advantage that producibility is easy and improvement in the performance of the obtained laminate body of a display device or the like is anticipated.

Furthermore, the composition design method of the pressure-sensitive adhesive layer forming organopolysiloxane composition according to the present invention is extremely simple, and for a composition having a certain resin component/polymer component ratio, simply substituting the organopolysiloxane resin with the aforementioned component (b2) in a range of 1 to 100 mass % is sufficient to increase the pressure-sensitive adhesive strength thereof and lower the glass transition point (Tg).

BRIEF DESCRIPTION OF THE DRAWINGS

FIG. 1 is a diagram of the glass transition point (Tg) of pressure-sensitive adhesive layers cured by pressure-sensitive adhesive layer forming organopolysiloxane compositions according to the examples and comparative examples plotted against the mass ratio (B/A) of the component (B) to component (A). However, example 10 and comparative example 9 are excluded.*In the examples, the pressure-sensitive adhesive layer has a lower Tg when contrasted with the same (B)/(A) value.

MODE FOR CARRYING OUT THE INVENTION

[Characteristics of Pressure-Sensitive Adhesive Layer Forming Organopolysiloxane Composition]

First, characteristics of the pressure-sensitive adhesive layer forming organopolysiloxane composition according to the present invention will be described. The composition is quickly cured by a curing reaction including a hydrosilylation reaction to form a pressure-sensitive adhesive layer with sufficient adhesive strength for practical use. However, by using an organopolysiloxane resin which contains few condensation-reactive functional groups and has a weight average molecular weight (Mw) of less than 4000 as measured in terms of standard polystyrene by GPC using toluene as component (b2), which is described below, as a major organopolysiloxane resin component, the composition can have both:

low temperature properties, wherein the pressure-sensitive adhesive layer has a low glass transition point (Tg) when a specific resin component/polymer component ratio is selected; and pressure-sensitive adhesive properties, wherein a strong pressure-sensitive adhesive force is provided when compared to a pressure-sensitive adhesive layer using another organopolysiloxane resin of a similar composition and having the same glass transition point (Tg).

As a result, compared to conventional silicone-based pressure-sensitive adhesive layers, the composition can easily achieve a low Tg and strong pressure-sensitive adhesive strength, and can provide a pressure-sensitive adhesive layer with both a low Tg and strong pressure-sensitive adhesive strength that are impossible to achieve with a conventional composition at a specific resin component/polymer component ratio.

As an example, the upper line in FIG. 1 below corresponds to conventional products and comparative experiments, while the lower line is an example of a product of the present invention (except for example 10 and comparative example 9). Herein, the higher the mass ratio of (B)/(A) corresponding to the resin/polymer component ratio, the stronger the pressure-sensitive adhesive strength of the pressure-sensitive adhesive layer tends to be. However, when the same (B)/(A) is used, the Tg is significantly lower when component (b2) is used (example: lower line) compared to the comparative example (upper line).

[Weight Average Molecular Weight (Mw) of Organopolysiloxane Resin]

In the present invention, "weight average molecular weight (Mw)" in the description of component (B), an organopolysiloxane resin or mixture thereof, refers to the weight average molecular weight (Mw) measured in terms of standard polystyrene by gel permeation chromatography (GPC) using toluene. Note that when a substance other than toluene (chloroform, tetrahydrofuran (THF), or the like) is used as a mobile phase, the technical effect of the present invention may not be achieved even though numerically the same weight average molecular weight is provided.

[Significance of Glass Transition Point (Tg, Tg') and "Tg+120" of Pressure-Sensitive Adhesive Layer]

The glass transition temperature (Tg) and (Tg') of the pressure-sensitive adhesive layer according to the present invention is a value derived from the peak value of a loss factor (tan δ) based on a dynamic viscoelasticity measurement test, as described below. Herein, Tg and Tg' can take zero (0) or negative values (such as −25° C.). Therefore, it is not possible to express the "lower Tg value" in the case of non-use of component (b2) as a simple ratio of Tg'/Tg when accurately expressing the characteristics of the present invention. Herein, it is unlikely that the glass transition point of a silicone cured product that can be used as a pressure-sensitive adhesive layer will be below −120° C.; therefore, by adding 120 to these numerical values such that the denominator and numerator do not have zero or negative values even if one has a very low Tg or Tg', the value of [Tg+120]/[Tg'+120] will be less than 1.0 by definition. Note that the Tg of the pressure-sensitive adhesive layer obtained by curing the pressure-sensitive adhesive layer forming organopolysiloxane composition according to the present invention, is not particularly limited, but may be in a range of −70° C. to +45° C., and may be designed in a range of −35° C. to +45° C.

Tg' is a hypothetical numerical value that represents the glass transition temperature (° C.) of a pressure-sensitive adhesive layer obtained by curing a composition obtained when component (b2) is substituted with an organopolysiloxane resin with a weight average molecular weight (Mw) of 4000 or more, as measured by the same method as component (b2) in the pressure-sensitive adhesive layer forming organopolysiloxane composition according to the present invention, assuming a certain composition. Herein, substituting component (b2) means that an organopolysiloxane resin with Mw 4000 or higher is used in place of the same mass of component (b2), and in both compositions, the mass ratio (B)/(A) of component (B), which is an organopolysiloxane resin, to component (A), which is a chain organopolysiloxane, is the same. As described above, the composition according to the present invention has a relatively lower value of Tg compared to compositions in which the other conditions of the composition/curing are the same without using component (b2), but instead an organopolysiloxane resin with a higher weight average molecular weight (4000 or higher) is used. Therefore, the value of [Tg+120]/[Tg'+120] is less than 1.0, which is one of the characteristics of the pressure-sensitive adhesive layer using the composition according to the present invention. As described above, Tg' is a hypothetical value when a resin component with Mw of 4000 or higher is used. If the Tg of the pressure-sensitive adhesive layer is actually calculated as Tg' when a resin component with an Mw of 4000 or more (e.g., Mw: 4070, and the like) is used (corresponding to a comparative test), more specific numerical values such as less than 0.99 and less than 0.98 can be obtained as the value of [Tg+120]/[Tg'+120].

[Each Component of Pressure-Sensitive Adhesive Layer Forming Organopolysiloxane Composition]

A pressure-sensitive adhesive layer forming organopolysiloxane composition that is suitable in the present invention contains:

(A) a chain organopolysiloxane having alkenyl groups in numbers greater than 1 on average in a molecule;

(B) an organopolysiloxane or a mixture thereof, containing the following components (b1) and (b2) at a mass ratio of 1:99 to 0:100:

(b1) an organopolysiloxane resin, where the total amount of hydroxyl groups and hydrolyzable groups with regard to all silicon atoms in a molecule is 9 mol % or less, and the weight average molecular weight (Mw) measured in terms of standard polystyrene by gel permeation chromatography (GPC) using toluene is 5500 or more, and (b2) an organopolysiloxane resin, where the total amount of hydroxyl groups and hydrolyzable groups with regard to all silicon atoms in a molecule is 9 mol % or less, and the weight average molecular weight (Mw) measured in terms of standard polystyrene by gel permeation chromatography (GPC) using toluene is less than 4000;

(C) an organohydrogenpolysiloxane having at least two Si—H bonds in a molecule; and (D) an effective amount of a hydrosilylation reaction catalyst, and may optionally contain (A') a chain organopolysiloxane without an alkenyl group and a silicon atom-bonded hydrogen atom in a molecule.

Furthermore, the composition contains a hydrosilylation reaction catalyst. Therefore, the composition may further contain (E) a curing retarder from the perspective of handling workability, and may further contain another additive within a scope that does not contradict the object of the present invention. Hereinafter, each component will be described.

The alkenyl group-containing organopolysiloxane of component (A) is a chain polysiloxane molecule, is the main agent (base polymer) of this composition, and contains an alkenyl group bonded to a number of silicon atoms greater than 1 on average in one molecule, with a preferable number of alkenyl groups being 1.5 or more per molecule. Examples of the alkenyl groups of the organopolysiloxane of component (A) include alkenyl groups having 2 to 10 carbon atoms, and vinyl groups or hexenyl groups are particularly preferable. Examples of the bonding position of the alkenyl groups of component (A) include the molecular chain ends and/or the molecular side chains. Note that component (A) may contain a single component or may be a mixture of two or more different components.

In the organopolysiloxane of component (A), examples of organic groups bonded to a silicon atom other than an alkenyl group include methyl groups and other alkyl groups;

phenyl groups and other aryl groups; aralkyl groups; alkyl halide groups; and the like. Methyl groups and phenyl groups are particularly preferred.

Component (A) is different from component (B) and has a chain polysiloxane molecular structure. For example, component (A) is preferably a straight chain or partially branched straight chain and may partially include a cyclic three-dimensional network. Preferably, the main chain contains repeating diorganosiloxane units and is preferably a straight-chain or branched-chain diorganopolysiloxane blocked at both molecular chain ends with triorganosiloxy groups. Note that the siloxane units which provide a branched-chain organopolysiloxane are T units or Q units described below.

The properties of component (A) at room temperature may be those of an oily or raw rubber-like substance, with the viscosity of component (A) being 50 mPa·s or more, and particularly preferably 100 mPa·s or more at 25° C. In particular, when the organopolysiloxane composition according to the present invention is a solvent type, at least a portion of component (A) is (A1) a raw rubber-like alkenyl group-containing organopolysiloxane having a viscosity of 100,000 mPa·s or less at 25° C. or having a plasticity (thickness when a 1 kgf load applied for 3 minutes to a 4.2 g spherical sample at 25° C. is read up to 1/100 mm and this value is multiplied by 100) within a range of 50 to 200, and more preferably within a range of 80 to 180 as measured in accordance with the method as prescribed in JIS K6249.

Note that from the perspective of preventing contact failure and the like, these alkenyl group-containing organopolysiloxanes preferably have volatile or low molecular weight siloxane oligomers (octamethyltetrasiloxane (D4), decamethylpentasiloxane (D5) and the like) reduced or eliminated. While the degree can be designed as desired, it may be less than 1% by mass of the total component (A), less than 0.1% by mass for each siloxane oligomer, and may be reduced to the vicinity of the detection limit as required.

Although the amount of alkenyl groups in component (A1) is not particularly limited, from the perspective of the technical effects of the present invention, the amount of alkenyl groups calculated as vinyl ($CH_2{=}CH$) groups in component (A1) (hereinafter, referred to as the "amount of vinyl") is preferably within a range of 0.005 to 0.400 mass %, and particularly preferably within a range of 0.005 to 0.300 mass %.

Preferably, the mass ratio of the chain organopolysiloxane to organopolysiloxane resin according to the present invention is in a prescribed range, and the use of a prescribed organopolysiloxane resin or mixture thereof makes it possible to simultaneously achieve strong pressure-sensitive adhesive strength in addition to a low storage elastic modulus.

Even component (A) having a lower viscosity than the abovementioned component (A1) is available as component (A) of the present invention. Specifically, an organopolysiloxane (A2) containing alkenyl groups having a viscosity of less than 100,000 mPa·s at 25° C. is available. Herein, examples other than the viscosity of component (A2) are the same as component (A1).

From the perspective of the technical effects of the present invention, 50 mass % or more of component (A) is preferably an alkenyl group-containing organopolysiloxane with a high degree of polymerization, which is component (A1), with 75 to 100 mass % thereof particularly preferably component (A1). In other words, when component (A1) (=an alkenyl group-containing organopolysiloxane with a higher degree of polymerization) and component (A2) (=an alkenyl group-containing organopolysiloxane with a lower degree of polymerization) are used in combination as component (A) of the present invention, the mass ratios of both range from 50:50 to 100:0, and more preferably 75:25 to 100:0 or 75:25 to 90:10.

[Other Cyclic Siloxanes Having an Alkenyl Group and Organosilicon Compounds]

In the present invention, a small amount of cyclic siloxanes having an 1,3,5,7-tetramethyl-1,3,5,7-tetravinylcyclotetrasiloxane or other alkenyl group, may be optionally used together with component (A). These cyclic siloxanes may serve as reactive diluents or curing reactivity control agents and may be used if necessary.

Similarly, organosilicon compounds having more than one alkenyl group on average in a molecule, which do not fall under component (A), component (B), and the cyclic siloxanes having an alkenyl group described above may be optionally used together with component (A). These organosilicon compounds are usually reaction mixtures of alkenyl group-containing silanes and alkenyl group-containing silane-siloxanes used as independent adhesion imparting agents in curable siloxane compositions, and are different components from the polydialkyl siloxanes and other polyorganosiloxane components or organopolysiloxane resin components. These organosilicon compounds have an alkenyl group and in addition to having an epoxy group in a molecule have excellent handling workability, and can impart favorable adhesion to various substrates in addition to rapidly curing by a hydrosilylation curing reaction without loss of viscoelastic properties such as shear storage elastic modulus G' at room temperature or the like. In particular, a pressure-sensitive adhesive layer having excellent tensile adhesive strength may be formed.

The organopolysiloxane resin (B) or mixture thereof is a characteristic configuration of the present invention, is a pressure-sensitive adhesion imparting component that imparts pressure-sensitive adhesive strength to a substrate, and is also a component that achieves the storage elastic modulus, stress, and a practical pressure-sensitive adhesive strength range of a silicone-based pressure-sensitive adhesive layer obtained by curing, when used at a certain ratio with component (A). More specifically, component (B) is an organopolysiloxane resin or a mixture of component (b1) and an organopolysiloxane resin, containing (b2) an organopolysiloxane resin in which the amount of hydroxyl groups or hydrolyzable groups is suppressed and with a weight average molecular weight (Mw) of less than 4000 in accordance with the previous definition, in a range of 1 to 100 mass % of the total amount of component (B). A technical effect of using component (B) is as described above, and it is possible to achieve both a lower Tg and pressure-sensitive adhesive strength of the pressure-sensitive adhesive layer as compared to the previously known composition. Furthermore, a hydrolysis/polymerization reaction with component (B) is unlikely to occur. Therefore, it is easy to design pressure-sensitive adhesive layers with physical properties such as moderate pressure-sensitive adhesive strength with the present invention, and by using resins alone or in combination with different average molecular weights, the prescribed storage elastic modulus in the pressure-sensitive adhesive layer, which is a cured product thereof, stress and practical pressure-sensitive adhesive strength range are achieved.

Specifically, component (B) is an organopolysiloxane resin or mixture thereof containing the following component (b1) and component (b2) at a mass ratio of 99:1 to 0:100. Herein, component (B) may include only the component (b2), or may be a mixture of components (b1) and (b2). The mass ratio of components (b1) and (b2) is preferably 60:40 to 0:100, and more preferably 50:50 to 0:100, 30:70 to 0:100, and 25:85 to 0:100. Furthermore, it is preferable that another organopolysiloxane resin other than components (b1) and (b2) is not included, and more specifically, it is particularly preferable that the amount of other organopolysiloxane resins is less than 1 mass % with respect to the total composition and that the amount intentionally added is zero.

(b1) an organopolysiloxane resin, where the total amount of hydroxyl groups and hydrolyzable groups with regard to all silicon atoms in a molecule is 9 mol % or less, and the weight average molecular weight (Mw) measured in terms of standard polystyrene by gel permeation chromatography (GPC) using toluene is 5500 or more, and (b2) an organopolysiloxane resin, where the total amount of hydroxyl groups and hydrolyzable groups with regard to all silicon atoms in a molecule is 9 mol % or less, and the weight average molecular weight (Mw) measured in terms of standard polystyrene by gel permeation chromatography (GPC) using toluene is less than 4000;

Regarding component (B), in other words, components (b1) and (b2), as a common property, the sum of the amount of hydroxyl groups and hydrolyzable groups in a molecule is within a range of 9 mol % or less with respect to all silicon atoms in the organopolysiloxane resin molecule, and is preferably 7 mol % or less with respect to all silicon atoms in the molecule. Note that in component (B), the amount of such hydroxyl groups and hydrolyzable groups can be expressed by converting all of these functional groups into hydroxyl groups. In this case, when the mass % is calculated assuming that all of the hydrolyzable groups other than the hydroxyl groups in the organopolysiloxane resin molecule are hydroxyl groups (OH), the sum of the amount of the aforementioned hydroxyl groups and hydrolyzable groups can be expressed such that the amount of these hydrolyzable groups, which are converted into hydroxyl groups and hydroxyl groups in the organopolysiloxane resin molecule, is 2.0 mass % or less, and preferably 1.6 mass % or less. The hydroxyl groups or hydrolyzable groups are groups which are directly bonded to silicon of the T units, Q units, or the like among the siloxane units in the below-mentioned resin structure, and obtained by hydrolyzing the silane or silane derivative which is a raw material. Consequently, the content of hydroxyl groups or hydrolyzable groups can be reduced by hydrolyzing the synthesized organopolysiloxane resin with a silylating agent such as trimethylsilane or the like.

In components (b1) and (b2), when the amount of the hydroxyl groups or hydrolyzable groups exceeds the above-mentioned upper limit, the condensation reaction between the organopolysiloxane resin molecules proceeds, thereby facilitating the formation of an organopolysiloxane resin structure having a large molecular weight in the cured product. Such an organopolysiloxane resin having a high molecular weight tends to impair the curability of the overall composition, the curability of the composition at low temperatures may be insufficient, and the resulting pressure-sensitive adhesive layer may not have sufficient storage elastic modulus for practical use.

Both components (b1) and (b2) are organopolysiloxane resins and are organopolysiloxanes having a three dimensional structure. Examples include: resins containing an $R_2SiO_{2/2}$ unit (D unit) and $RSiO_{3/2}$ unit (T unit) (where R mutually independently represents a monovalent organic group) and having an amount of hydroxyl groups or hydrolyzable groups within the aforementioned range; resins containing only a T unit and having an amount of hydroxyl groups or hydrolyzable groups within the aforementioned range; resins containing an $R_3SiO_{1/2}$ unit (M unit) and $SiO_{4/2}$ unit (Q unit) and having an amount of hydroxyl groups or hydrolyzable groups within the aforementioned range; and the like. In particular, a resin (also referred to as MQ resin) is preferably used, which contains an $R_3SiO_{1/2}$ unit (M unit) and $SiO_{4/2}$ unit (Q unit) and where the sum of the amount of hydroxyl groups and hydrolyzable groups with regard to all silicon atoms in a molecule is 0 to 7 mol % (and preferably within a range of 0.0 to 1.6 mass % when all of these functional groups are converted into hydroxyl groups).

The monovalent organic group of R is preferably a monovalent hydrocarbon group with 1 to 10 carbon atoms, with examples thereof including alkyl groups with 1 to 10 carbon atoms, alkenyl groups with 2 to 10 carbon atoms, aryl groups with 6 to 10 carbon atoms, cycloalkyl groups with 6 to 10 carbon atoms, benzyl groups, phenylethyl groups, and phenylpropyl groups. In particular, R preferably does not include an alkenyl group, 90 mol % or more of R is preferably phenyl groups or alkyl groups having 1 to 6 carbon atoms, while 95 to 100 mol % of R is particularly preferably methyl groups or phenyl groups.

When component (b1) and component (b2) are resins containing an $R_3SiO_{1/2}$ unit (M unit) and $SiO_{4/2}$ unit (Q unit), the molar ratio of M units to Q units is preferably 0.5 to 2.0. This is because when the molar ratio is less than 0.5, the pressure-sensitive adhesive force to the substrate may be reduced, whereas when the molar ratio is greater than 2.0, the cohesive strength of a material configuring a pressure-sensitive adhesive layer decreases. Moreover, D units and T units may also be included in component (B) to an extent that does not impair the properties of the present invention. Furthermore, from the perspective of contact failure prevention and the like, these organopolysiloxane resins may have a low molecular weight siloxane oligomer reduced or eliminated.

The organopolysiloxane resins which are components (b1) and (b2) differ from each other in terms of the weight average molecular weight (Mw) thereof. Herein, the weight average molecular weight (Mw) is the average molecular weight, taking into consideration the proportion of each molecule in each organopolysiloxane resin measured in terms of standard polystyrene by gel permeation chromatography (GPC) using toluene as mobile phase solvent. Note that the technical effect of the present invention is derived from the resin structure; therefore, the average molecular weight refers to the average molecular weight of the resin structure. Therefore, when the GPC of organopolysiloxane resin is measured, if there is, in addition to the main peak derived from the main organopolysiloxane resin component, a peak derived from an unavoidably mixed low molecular weight component such as a siloxane oligomer or the like, which can be distinguished from the main peak, the weight average molecular weight (Mw) calculated based only on the major peak excluding the low molecular weight component is the weight average molecular weight of component (b1) or (b2).

Component (b1) is an organopolysiloxane resin having a large molecular weight, where the weight average molecular weight (Mw) thereof is 5500 or more. In practical use, component (b1) is particularly preferably a resin containing the aforementioned $R_3SiO_{1/2}$ unit (M unit) and $SiO_{4/2}$ unit (Q unit), where the weight average molecular weight (Mw) is within a range of 5500 to 10000.

Component (b2) is an organopolysiloxane resin with a low molecular weight, which is a characteristic configuration of the present invention, and the weight average molecular weight (Mw) thereof is less than 4000, preferably in a range of 1000 to 3900, and particularly preferably in a range of 2000 to 3850. In practical use, component (b2) is particularly preferably a resin containing the aforementioned $R_3SiO_{1/2}$ unit (M unit) and $SiO_{4/2}$ unit (Q unit), where the weight average molecular weight (Mw) is within a range of 2000 to 3800. Note that as described above, the average molecular weight is the molecular weight of the resin structure, and thus is the weight average molecular weight based on the main peak of the organopolysiloxane resin in GPC, not including unavoidably mixed low molecular weight components such as siloxane oligomers and the like, and is preferably a resin structure excluding low molecular weight components having a molecular weight of less than 1000.

[Mass Ratio of Component (B) to Component (A) and Component (A')]

The pressure-sensitive adhesive layer forming organopolysiloxane composition according to the present invention preferably has a mass ratio of component (B), which is an organopolysiloxane resin, with respect to component (A) and component (A') described later, which are chain reactive siloxane components, within a range of 0.9 to 4.0. The mass ratio [(B)/(A)] of component (B) to component (A) may be in a range of 1.0 to 2.5 or 1.3 to 2.3.

This is because, when the aforementioned characteristic organopolysiloxane resin or mixture thereof is selected as component (B), and the aforementioned resin component is blended so as to be within the range above with respect to the chain siloxane polymer component, viscoelastic properties such as high storage elastic modulus, stress, and the like, which are objects of the present invention, are suitably achieved. In particular, from the perspective of increasing the pressure-sensitive adhesive strength of a resulting pressure-sensitive adhesive layer, the mass ratio of component (B) to the sum of component (A) and component (A') described later may be within a range of 1.5 to 4.0, and in order to achieve a desired pressure-sensitive adhesive strength and storage elastic modulus, is particularly preferably with a range of 1.5 to 3.5. In contrast, when the mass ratio of component (B) to component (A) and component (A') is outside the aforementioned range, properties such as curability, pressure-sensitive adhesive strength, storage elastic modulus, and the like, which are objects of the present invention, may not be achieved even when other configurations are adjusted.

Component (C) is an organohydrogenpolysiloxane having two or more Si—H bonds in the molecule and is a cross-linking agent of the organopolysiloxane composition of the present invention. The molecular structure of component (C) is not particularly limited, with examples thereof including a straight chain, a partially branched straight chain, a branched chain, a cyclic, or an organopolysiloxane resin structure, and with a straight chain, a partially branched straight chain, or an organopolysiloxane resin structure being preferable. The bonding position of silicon atom-bonded hydrogen atoms is not particularly limited, with examples thereof including molecular chain ends, side chains, and both molecular chain ends and side chains.

The amount of the silicon atom-bonded hydrogen atoms is preferably from 0.1 to 2.0 mass %, and more preferably from 0.5 to 1.7 mass %.

Examples of the organic group bonded to a silicon atom include methyl groups and other alkyl groups having 1 to 8 carbon atoms; phenyl groups and other aryl groups; aralkyl groups; and alkyl halide groups. 50 mol % or more of the total number thereof is preferably a phenyl group or alkyl group with 1 to 8 carbon atoms. From the perspective of ease of manufacture and compatibility with the preferred components (A) and (B) described above, the other organic groups are preferably methyl groups or phenyl groups.

Specific examples of component (C) include tris(dimethylhydrogensiloxy)methylsilane, tetra(dimethylhydrogensiloxy)silane, methylhydrogenpolysiloxanes blocked at both ends with trimethylsiloxy groups, dimethylsiloxane/methylhydrogensiloxane copolymers blocked at both ends with trimethylsiloxy groups, dimethylsiloxane/methylhydrogensiloxane copolymers blocked at both ends with dimethylhydrogensiloxy groups, cyclic methylhydrogen oligosiloxanes, cyclic methylhydrogensiloxane/dimethylsiloxane copolymers, methylhydrogensiloxane/diphenylsiloxane copolymers blocked at both molecular chain ends with trimethylsiloxy groups, methylhydrogensiloxane/diphenylsiloxane/dimethylsiloxane copolymers blocked at both molecular chain ends with trimethylsiloxy groups, hydrolytic condensates of trimethylsilanes, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units, and $(C_6H_5)SiO_{3/2}$ units, copolymers consisting of $(CH_3)_2HSiO_{1/2}$ units and $CH_3SiO_{3/2}$ units, and mixtures of two or more types thereof.

[SiH/Vi Ratio]

The composition providing a suitable pressure-sensitive adhesive layer according to the present invention is hydrosilylation reaction curable, and the amount of component (C) used is not particularly limited so long as the composition can be sufficiently cured via a hydrosilylation reaction. However, the substance amount of silicon atom-bonded hydrogen atom (SiH) groups in component (C) with regard to the sum of the amount (substance amount) of alkenyl groups in component (A) and the amount (substance amount) of alkenyl groups in component (B) in the composition, in other words, the molar ratio, is preferably within a range of 0.1 to 100, but may be within a range of 0.5 to 60, within a range of 1.0 to 50, or within a range of 1.0 to 40. Note that the molar ratio hereinafter is referred to as the "SiH/Vi ratio".

In contrast, in order to improve close adhesion to a substrate of glass and the like, the amount of SiH groups can be designed so as to be 10 or more and 20 or more, preferably more than 11, and more preferably 22 or more. For example, the substance amount of silicon atom-bonded hydrogen atom (SiH) groups in component (C) with regard to the sum of the amount (substance amount) of alkenyl groups in component (A) and the amount (substance amount) of alkenyl groups in component (B) in the composition can be designed so as to be within a range of 11 to 60, a range of 21 to 60, or a range of 22 to 50. When the amount of the SiH groups falls below the abovementioned lower limit, the technical effect of improving close adhesion to the substrate may not be achieved. In contrast, when the amount of the SiH groups exceeds the abovementioned upper limit, the amount of unreacted residual curing agent becomes large, potentially having adverse effects on curing physical properties such as the brittleness of the cured product or potentially causing problems such as gas generation. However, a practically sufficient pressure-sensitive adhesive layer may be formed even when the SiH/Vi ratio of the composition is outside the aforementioned range.

Note that when cyclic siloxanes having an alkenyl group and organosilicon compounds other than components (A) and component (B) are optionally used, from the perspective of the curability of the composition according to the present invention, the amount of silicon atom-bonded hydrogen atom (SiH) groups in component (C) relative to the total amount (substance amount) of alkenyl groups in the composition including these components is preferably 1.0 or more, and the substance amount of the silicon atom-bonded hydrogen atom (SiH) groups in component (C) may be within a range of 1.5 to 60, or may be within a range of 21 to 60.

[Hydrosilylation Reaction Catalyst]

The organopolysiloxane composition of the present invention contains a hydrosilylation reaction catalyst. Examples of hydrosilylation reaction catalysts include platinum-based catalysts, rhodium-based catalysts, and palladium-based catalysts, with platinum-based catalysts being preferable in that they markedly accelerate the curing of the present composition. The platinum-based catalyst is preferably a platinum-alkenylsiloxane complex, and particularly preferably 1,3-divinyl-1,1,3,3-tetramethyldisiloxane due to the favorable stability of the platinum-alkenylsiloxane complex. Note that as the catalyst for promoting the hydrosilylation reaction, a non-platinum-based metal catalyst such as iron, ruthenium, iron/cobalt, or the like may be used. Furthermore, optionally, a photoactive hydrosilylation reaction catalyst such as (methylcyclopentadienyl)trimethylplatinum (IV) and bis(2,4-pentanedionato)platinum(II) may be used.

While the amount of the hydrosilylation reaction catalyst is not particularly limited in the present invention, the amount of the platinum-based metal with regard to the total amount of solid fractions in the composition is within a range of 0.1 to 200 ppm, and may be within a range of 0.1 to 150 ppm, within a range of 0.1 to 100 ppm, or within a range of 0.1 to 50 ppm. Here, the platinum-based metal is a metal element of group VIII consisting of platinum, rhodium, palladium, ruthenium, and iridium; however, in practical use, the content of the platinum-metal excluding the ligands of the hydrosilylation reaction catalyst is preferably within the range described above. Note that the solid fraction is a component that forms the cured layer (primarily a main agent, an adhesion-imparting component, a crosslinking agent, a catalyst, and other non-volatile components) when the organopolysiloxane composition of the present invention is subjected to a curing reaction and does not include volatile components such as solvents that volatilize at the time of heat curing.

When the content of the platinum-based metal in the organopolysiloxane composition according to the present invention is 50 ppm or less (45 ppm or less, 35 ppm or less, 30 ppm or less, 25 ppm or less, or 20 ppm or less), this may suppress discoloration or coloration of the transparent pressure-sensitive adhesive layer, in particular, after curing or when heated or exposed to high-energy rays such as UV rays. Meanwhile, from the perspective of the curability of the organopolysiloxane composition, the content of the platinum-based metal is no lower than 0.1 ppm, because when the content is lower than this lower limit, this may cause curing defects.

Component (E) is a curing retarder and is compounded in order to suppress crosslinking reactions between the alkenyl groups in the composition and the SiH groups in component (C) so as to extend the usable life at ordinary temperatures and enhance the storage stability. Therefore, in practical use, the component is nearly essential to the pressure-sensitive adhesive layer forming organopolysiloxane composition of the present invention.

Specific examples of component (E) include acetylenic compounds, ene-yne compounds, organic nitrogen compounds, organic phosphorus compounds, and oxime compounds. Specific examples include: alkyne alcohols such as 3-methyl-1-butyne-3-ol, 3,5-dimethyl-1-hexyne-3-ol, 3-methyl-1-pentyne-3-ol, 1-ethynyl-1-cyclohexanol, phenyl butanol, and the like; ene-yne compounds such as 3-methyl-3-pentene-1-yne, 3,5-dimethyl-1-hexane-3-yne, and the like; methylalkenylcyclosiloxanes such as 2-ethynyl-4-methyl-2-pentene, 1,3,5,7-tetramethyl-1,3,5,7-tetravinylcyclotetrasiloxane, 1,3,5,7-tetramethyl-1,3,5,7-tetrahexenylcyclotetrasiloxane, and the like, as well as benzotriazoles.

From the perspective of the curing behavior of the composition, the pressure-sensitive adhesive layer forming organopolysiloxane composition of the present invention is preferably curable at 80 to 200° C., with an increase in viscosity of 1.5-fold after 8 hours at room temperature following the preparation of the composition. The suppression of thickening is important from the perspective of handleability, pot life, and properties after curing and contains a large excess of component (C), wherein, even if the content of the platinum-based metal is optionally low, the curability can be ensured by curing at high temperatures of at least a certain temperature (80 to 200° C.). Note that such a composition can be realized by selecting a suitable combination and compounded amounts of each of the components described above, the hydrosilylation catalyst, and component (E).

In addition to the preferred components (A) and (B) described above, the preferred organopolysiloxane composition according to the present invention may also contain an organic solvent as a solvent. The type and blending amount of the organic solvent is adjusted taking the coating workability and the like into consideration. Examples of organic solvents include: toluene, xylene, benzene, and other aromatic hydrocarbon-based solvents; heptane, hexane, octane, isoparaffin, and other aliphatic hydrocarbon-based solvents; ethyl acetate, isobutyl acetate, and other ester-based solvents; diisopropyl ether, 1,4-dioxane, and other ether-based solvents; trichloroethylene, perchloroethylene, methylene chloride, and other chlorinated aliphatic hydrocarbon-based solvents; solvent volatile oils; and the like. Two or more types thereof may be combined in accordance with the wettability of the sheet-like substrate or the like. A compounded amount of the organic solvent is preferably an amount such that a mixture of components (A) to (C) can be uniformly applied to a sheet-like substrate surface. For example, the compounded amount may be from 5 to 3000 parts by mass per total of 100 parts by mass of components (A), (B), and (C).

The preferred organopolysiloxane composition according to the present invention may optionally contain components other than the components described above to an extent that does not impair the technical effects of the present invention. Examples can include: adhesion promoters; polydimethylsiloxane, polydimethyldiphenylsiloxane, and other non-reactive organopolysiloxanes; antioxidants; light stabilizers; flame retardants; one or more types of antistatic agents; and the like. Note that in addition to these components, pigments, dyes, inorganic microparticles (reinforcing fillers, dielectric fillers, conductive fillers, thermally conductive fillers), and the like can be optionally blended.

[(A') Chain Organopolysiloxane without Alkenyl Group and Silicon Atom-Bonded Hydrogen Atom in Molecule]

The preferred organopolysiloxane composition according to the present invention can blend a non-reactive organopolysiloxane such as a polydimethylsiloxane, polydimethyldiphenylsiloxane, or the like that does not have an alkenyl group and a silicon atom-bonded hydrogen atom. As a result, it may be possible to improve the loss coefficient (tan δ), storage elastic modulus (G'), and loss modulus (G") described later of the pressure-sensitive adhesive layer. For example, the loss coefficient of the pressure-sensitive adhesive layer can be increased using a polydimethylsiloxane having a hydroxyl group end and a polydimethylsiloxane or polydimethyldiphenylsiloxane having a trimethylsiloxy end, and such compositions are included within the scope of the present invention.

Herein, component (A') is a chain organopolysiloxane that is not involved in the curing reaction by hydrosilylation, and the mass ratio of component (B) in the composition can affect the properties of the composition, such as the pressure-sensitive adhesive strength, storage elastic modulus, and the like. As described above, the mass ratio of component (B) to component (A) and component (A') may be within a range of 0.9 to 4.0, and in order to achieve a desired pressure-sensitive adhesive strength and storage elastic modulus, is particularly preferably within a range of 1.5 to 3.5. Note that the mass ratio of component (A) to component (A') is not particularly limited, but may be designed to be within a range of 100:0 to 60:40, 100:0 to 65:35, 90:10 to 65:35, 85:15 to 70:30, or the like, depending on the desired storage elastic modulus and the mass ratio to component (B).

The method of preparing the organopolysiloxane composition of the present invention is not particularly limited and is performed by homogeneously mixing the respective components. A solvent may be added as necessary, and the composition may be prepared by mixing at a temperature of 0 to 200° C. using a known stirrer or kneader.

The organopolysiloxane composition of the present invention forms a coating film when coated onto a substrate and forms a pressure-sensitive adhesive layer, which is a cured product, by heating under temperature conditions of 80 to 200° C., and preferably under temperature conditions of 90 to 190° C. Note that when a photoactive hydrosilylation reaction catalyst is used, the pressure-sensitive adhesive layer, which is a cured product, is formed by irradiating the coating film with a high energy beams and then heating at room temperature or as desired. For example, in the case of irradiating ultraviolet light, the integrated irradiation dose at a wavelength of 365 nm is preferably within a range of 100 $mJ/cm^2$ to 100 $J/cm^2$.

Examples of application methods include gravure coating, offset coating, offset gravure, roll coating, reverse roll coating, air knife coating, curtain coating, and comma coating. The coating amount can be designed at a desired thickness in accordance with the application such as a display device. For example, the thickness of the pressure-sensitive adhesive layer after curing may be from 1 to 1000 μm, from 5 to 900 μm, or from 10 to 800 μm, but there is no limitation thereto.

[Storage Elastic Modulus G' of Pressure-Sensitive Adhesive Layer at Low Temperature (−20° C.) and Room Temperature (25° C.)]

The pressure-sensitive adhesive layer according to the present invention further preferably has a storage elastic modulus G' at 25° C. of 0.01 MPa or more, more preferably in a range of 0.01 to 2.0 MPa, and particularly preferably in a range of 0.01 to 1.5 MPa. Similarly, the aforementioned pressure-sensitive adhesive layer used for a display device according to the present invention preferably has a storage elastic modulus G' at −20° C. in a range of 0.02 to 25 MPa, and particularly preferably in a range of 0.03 to 20 MPa. When the pressure-sensitive adhesive layer is within the ranges above for the storage elastic modulus G' at low temperature (−20° C.) and room temperature (25° C.), close adhesion to a member, followability, and flexibility are not impaired in the temperature range where the display device is used, from low to high temperatures. In particular, at high and low temperatures, the film maintains a high degree of flexibility and close adhesion even when the display is deformed, and thus reliability and durability are particularly excellent.

[Range of Pressure-Sensitive Adhesion and Pressure-Sensitive Adhesive Strength]

A silicone-based pressure-sensitive adhesive layer formed by curing the pressure-sensitive adhesive layer forming organopolysiloxane composition according to the present invention by a hydrosilylation reaction is provided between members.

Preferably, a pressure-sensitive adhesive layer can be designed such that the pressure-sensitive adhesive force of the pressure-sensitive adhesive layer having a thickness of 50 μm obtained by curing the organopolysiloxane composition, as measured at a tensile rate of 300 mm/min using a 180° peeling test method in accordance with JIS Z 0237 for a polymethyl methacrylate sheet having a thickness of 2 mm, is 360 gf/inch or more, preferably 400 gf/inch or more, and particularly preferably within a range of 500 to 3500 gf/inch. A pressure-sensitive adhesive layer having pressure-sensitive adhesive force within a range of 800 to 3500 gf/inch is preferable. Note that the thickness (50 μm) described above is the thickness of the cured layer itself serving as a reference for objectively defining the pressure-sensitive adhesive force of the cured layer according to the present invention. It goes without saying that the organopolysiloxane composition of the present invention is not limited to a thickness of 50 μm and may be used as a cured layer or a pressure-sensitive adhesive layer of an arbitrary thickness.

[Storage Elastic Modulus and Other Mechanical Properties]

The pressure-sensitive adhesive layer according to the present invention preferably has the storage elastic modulus G' at low temperature (−20° C.) and room temperature (25° C.) described in paragraph 0021 above. Furthermore, the silicone-based pressure-sensitive adhesive layer according to the present invention may suitably have a storage elastic modulus G' at 1.0 Hz at −20° C. which is no less than three-fold the storage elastic modulus G' at 1.0 Hz at 25° C.

[Properties Related to Transparency, Color Tone, or Coloration and Discoloration of Pressure-Sensitive Adhesive Layer]

The pressure-sensitive adhesive layer according to the present invention may be substantially transparent, translucent, or opaque, such that the transparency thereof can be designed in accordance with the application of the pressure-sensitive adhesive layer. When it is visually transparent, or more objectively, when the value for air is 100%, the transmittance of light at a wavelength of 450 nm of the pressure-sensitive adhesive layer for a display device formed from a cured layer having a thickness of 100 μm is 80% or higher, and preferably 90% or higher, and may be designed so as to be 95% or higher. In contrast, for the adhesion and the like of the electrical or electronic part, which does not require light transmittance, a semi-transparent to opaque pressure-sensitive adhesive layer may be used, with a filler component or additive, which impairs colorability or transmittance of visible light, ultraviolet light, or the like, capable of being used depending on the required characteristics other than light transmittance.

The pressure-sensitive adhesive layer according to the present invention can be suitably designed such that a cured product is not colored, in addition to the aforementioned transparency, by optionally reducing the amount of the platinum-based metal in the cured layer. Furthermore, even when the cured layer of the present invention is exposed to high temperatures or high-energy beams such as UV rays or the like for an extended period of time, design can be such that the color tone thereof does not change significantly and the problem of yellowing, in particular, does not occur.

[Method of Use as Pressure-Sensitive Adhesive Layer]

Preferably, in order to improve close adhesion with an adherend, surface treatments such as primer treatment, corona treatment, etching treatment, plasma treatment, and the like may be performed on the surface of the pressure-sensitive adhesive layer according to the present invention or the substrate.

The curable organopolysiloxane composition according to the present invention is cured by applying the composition to a release liner, then heating under the temperature conditions described above, and after the release liner is peeled off and the composition is attached to a film-like substrate, a tape-like substrate, or a sheet-like substrate (hereinafter, referred to as a "film-like substrate") or applied to a film-like substrate, curing by heating at the temperature conditions described above so as to form a pressure-sensitive adhesive layer on the surface of the substrate can be performed. In particular, when the cured layer obtained by curing the organopolysiloxane composition is a pressure-sensitive adhesive layer, and particularly a pressure-sensitive adhesive film, the cured layer is preferably treated as a laminate body film that is releasably adhered in a pressure-sensitive manner to a film substrate provided with a release layer having a release-coating capability. The release layer may suitably be a release layer having release-coating capability, such as a silicone release agent, a fluorine release agent, an alkyd release agent, a fluorosilicone release agent, or the like, or a substrate itself that has physically formed minute irregularities on the surface of the substrate or that is difficult to adhere to the pressure-sensitive adhesive layer of the present invention. The use of a release layer obtained by curing a fluorosilicone release agent is preferred. Note that in the aforementioned laminated body, the release layer may be a different release layer, which is a first release layer and a second release layer having different types of release agents and different release forces configuring the release layer. The fluorosilicone release agent may be a curing reactive silicone composition containing one or more types of fluorine-containing groups selected from fluoroalkyl groups and perfluoropolyether groups.

The cured product obtained by curing the organopolysiloxane composition according to the present invention has both viscoelastic properties and adhesive strength as described above, making it useful as a member of various types of electronic apparatuses or electrical devices as an elastic pressure-sensitive adhesive member. In particular, the cured product is useful as an electronic material, a member for a display device, or a member for a transducer (including sensors, speakers, actuators, and generators), and a suitable application for the cured product is a member of an electronic part or display device. The cured product according to the present invention may be transparent or opaque, wherein, in particular, a film-shaped cured product, particularly a substantially transparent pressure-sensitive adhesive film, is suitable as a member for a display panel or a display, and is particularly useful in so-called touch panel applications in which a device, particularly an electronic apparatuses, can be operated by touching a screen with a fingertip or the like. Moreover, the opaque elastic pressure-sensitive adhesive layer is not required to have transparency, making it particularly useful for applications of film-like or sheet-like members used in sensors, speakers, actuators, and the like which require constant elasticity or flexibility in the pressure-sensitive adhesive layer itself.

In particular, the pressure-sensitive adhesive layer obtained by curing the organopolysiloxane composition according to the present invention is capable of achieving a pressure-sensitive adhesive properties equivalent to conventional silicone pressure-sensitive adhesive layers, and can improve close adhesion to a substrate of a display device or the like without causing problems due to inferior curing or reduced curability.

[Display Panel or Display Member]

A cured product obtained by curing the organopolysiloxane composition of the present invention can be used in the construction and use of a laminated touch screen or flat panel display, with the specific method of use thereof capable of being a known method of use of a pressure-sensitive adhesive layer (in particular, silicone PSA) without any particular limitation. In particular, the pressure-sensitive adhesive layer obtained or designed using the present invention combines a low Tg and strong pressure-sensitive adhesive strength as described above. Therefore, specifically, a display device having the pressure-sensitive adhesive layer between members can be widely applied to flexible displays, such as curved displays used for vehicle or aircraft seats, and the like, foldable displays in which a digital display is folded in the form of two or three folds, and the like, deformable displays in which the entire display surface can be retracted or folded in an arbitrary direction, and deformable displays in which the entire display surface can be expanded and contracted (particularly stretched) in an arbitrary direction, and thus can be improved in durability and reliability.

In addition, a cured product obtained by curing the organopolysiloxane composition of the present invention can be used in the manufacturing of a display device such as a touch panel or the like as an optically transparent silicone-based pressure-sensitive adhesive film or a pressure-sensitive adhesive layer disclosed in Japanese PCT Application No. 2014-522436, Japanese PCT Application No. 2013-512326, or the like described above. Specifically, the cured product obtained by curing the organopolysiloxane composition of the present invention can be used as the pressure-sensitive adhesive layer or pressure-sensitive adhesive film described in Japanese PCT Application No. 2013-512326 without any particular limitation.

As an example, the touch panel according to the present invention may be a touch panel including a substrate such as a conductive plastic film having a conductive layer formed on one surface, with a cured layer obtained by curing the curable organopolysiloxane composition of the present invention, which is attached to a surface on the side on which the conductive layer is formed or on the opposite side thereof. The substrate is preferably a sheet-like or film-like substrate, with an example thereof being a resin film or a glass plate. In addition, the conductive plastic film may be a resin film or a glass plate, in particular, a polyethylene terephthalate film, having an ITO layer formed on one surface thereof. These are disclosed in the aforementioned Japanese PCT Application No. 2013-512326 and the like.

In addition, the cured product obtained by curing the organopolysiloxane composition of the present invention may be used as an adhesive film for a polarizing plate used in manufacturing a display device such as a touch panel or the like, and may be used for adhering between a touch panel and a display module as described in Japanese Unexamined Patent Application 2013-065009 as a pressure-sensitive adhesive layer.

EXAMPLES

Examples of the present invention and comparative examples are described hereinafter. Note that “cured” in each of the examples, comparative examples, and reference examples indicates that each composition has fully cured under the respective curing conditions.

(Preparation of Curing Reactive Organopolysiloxane Composition)

The curing reactive organopolysiloxane compositions illustrated in each of the examples, comparative examples, and reference examples were prepared using the components shown in Table 1. Note that all percentages in Table 1 refer to mass %.

(Measurement of Molecular Weight of Organopolysiloxane Component)

Using a gel permeation chromatography (GPC) Alliance available from Waters and toluene as a solvent, the weight average molecular weight (Mw) and number average molecular weight (Mn) of organopolysiloxane components such as organopolysiloxane resin and the like were determined by calculation based on polystyrene.

(Measurement of Amount of Hydroxyl Groups (OH) in Organopolysiloxane Resin)

Using an ACP-300$^{29}$Si NMR spectrometer manufactured by Bruker provided with a glass-free probe, when the chemical shift of the tetramethylsilane was set to 0 ppm, the molar content was obtained from the presence ratio of $Si(OH)O_{2/3}$ units appearing at −93 to −103.5 ppm to all silicons, then further converted into the mass % of the hydroxyl groups (OH) in the organopolysiloxane resin. Note that hydrolyzable functional groups other than hydroxyl groups were not included in the organopolysiloxane resin in the following examples.

(Pressure-Sensitive Adhesive Force Measurement)

Each composition was applied to a PET film (available from Toray Co., Ltd., product name: Lumirror (registered trademark) S10, thickness: 50 μm) such that the thickness after curing was 50 μm, after which it was cured for 3 minutes at 150° C. After being left to stand for one day, the sample was cut to a width of 20 mm and the pressure-sensitive adhesive layer surface was adhered to a PMMA plate (manufactured by Paltec, ACRYLITE L001, 50×120×2 mm) using a roller to form a test piece. Regarding the test piece using the PMMA plate, the pressure-sensitive adhesive force (measurement at a width of 20 mm converted to the display unit gf/inch) was measured at a tensile rate of 300 mm/min using a 180° peeling test method in accordance with JIS Z 0237, using an RTC-1210 tensile tester manufactured by Orientec Co., Ltd. The results are shown in Table 2.

(Dynamic Viscoelasticity)

Each composition was applied to a release liner coated via fluorosilicone release coating such that the thickness after curing was approximately 100 μm, then cured at 150° C. for three minutes. Alternatively, each composition was applied to a release liner coated via fluorosilicone release coating such that the thickness after curing was approximately 280 μm, then cured at 150° C. for 15 minutes. Five or more of the pressure-sensitive adhesive films for 100 μm and two for 280 μm were overlaid to obtain a film sample with a thickness of at least 500 μm, with both surfaces sandwiched by a release liner. The film was cut to a diameter of 8 mm and adhered to the parallel plate probe of a dynamic viscoelastic device (DMA; MCR301 available from Anoton Paar) and then was measured. The measurement conditions were within a range of −70° C. to +250° C., the measurements were carried out at a frequency of 1 Hz and a temperature increase rate of 3° C./minute, the loss factor (tan δ), storage elastic modulus G', and loss elastic modulus G" were measured (units: MPa). The storage elastic modulus G' at 25° C. and −20° C. is shown in Table 2. Furthermore, the glass transition point (Tg) (° C.) of each pressure-sensitive adhesive film was determined from the peak value of the loss factor (tan δ) and is also shown in Table 2.

Materials of the curing reactive organopolysiloxane compositions are shown in Table 1. Note that the viscosity or plasticity of each component was measured at room temperature using the following methods.

[Viscosity]

The viscosity (mPa-s) is a value measured using a rotary viscometer conforming to JIS K7117-1, while the kinematic viscosity (mm$^2$/s) is a value measured with an Ubbelohde viscometer conforming to JIS Z8803).

[Plasticity]

The plasticity was expressed as a value measured in accordance with the method prescribed in JIS K 6249 (thickness when a 1 kgf load was applied for 3 minutes to a 4.2 g spherical sample at 25° C. was read up to 1/100 mm, and this value was multiplied by 100).

TABLE 1

Components of the curing reactive organopolysiloxane compositions

| Component Name | Component |
|---|---|
| Component a | Gum-like polydimethylsiloxane blocked with vinyl groups at both ends of a molecular chain, plasticity: 152, amount of vinyl: 0.013 mass %. |
| Component a' | Gum-like polydimethylsiloxane blocked with trimethylsilyl groups at both ends of a molecular chain, plasticity: 170 |
| Component b1 | Xylene solution of MQ silicone resin with silicon atom-bonded hydrogen groups containing a $(CH_3)_3SiO_{1/2}$ unit and $SiO_{4/2}$ unit with an M/Q ratio of approximately 0.9 (solid fraction: 64.0 mass %), Mw: 6970, amount of OH: 4.5 mol % (1.0 mass %) |
| Component b2' | Xylene solution of MQ silicone resin with silicon atom-bonded hydrogen groups containing a $(CH_3)_3SiO_{1/2}$ unit and $SiO_{4/2}$ unit with an M/Q ratio of approximately 1.0 (solid fraction: 69.9 mass %), Mw: 4070, amount of OH: 3.5 mol % (0.8 mass %) |
| Component b2 | Xylene solution of MQ silicone resin with silicon atom-bonded hydrogen groups containing a $(CH_3)_3SiO_{1/2}$ unit and $SiO_{4/2}$ unit with an M/Q ratio of approximately 1.0 (solid fraction: 72.5 mass %), Mw: 3760, amount of OH: 3.5 mol % (0.8 mass %) |
| Component c | Dimethylsiloxane-methylhydrogensiloxane copolymer blocked with trimethylsiloxy groups at both ends of a molecular chain, Mw: 1600, amount of SiH: 0.73 mass % |
| Component d1 | Platinum-based hydrosilylation reaction medium, containing 0.62 mass % of platinum |
| Component d2 | Platinum-based hydrosilylation reaction medium, containing 0.52 mass % of platinum |
| Component e | 20 mass % toluene solution of 1-ethynyl-1-cyclohexanol |

Examples 1 to 10, Comparative Examples 1 to 9

Compositions for Examples 1 to 10 and Comparative Examples 1 to 9 were prepared and cured in accordance with the items above (dynamic viscoelasticity) and (pressure-sensitive adhesive strength measurement), and the pressure-sensitive adhesive strength, glass transition point (Tg), and storage elastic modulus G' at 25° C./−20° C. are shown in Table 2.

Furthermore, FIG. 1 plots (B)/(A) against Tg for Examples 1 to 9 and Comparative Examples 1 to 8. Each data point followed the linear approximation depicted in FIG. 1. From the equations of these straight lines depicted in FIG. 1, values R, in which the value of [Tg+120]/[(B)/(A)] when a component with a weight average molecular weight (Mw) of less than 4000 is used as component (b2) in component (B) is divided by the value of [Tg'+120]/[(B)/(A)] when a component (component b2') with a weight average molecular weight (Mw) of 4000 or more is used instead of component (b2), were determined for when the value of (B)/(A) was 1.5, 1.7, 1.9 and 2.1, which are shown in Table 3. Note that plots for Example 10 and Comparative Example 9 are not depicted in FIG. 1 because of the large amount of component (b1) in component (B), and (Tg+120)/(Tg'+120) at the same (B)/(A) ratio is shown separately.

Example 1

33.3 parts by weight of component a, 8.33 parts by weight of component a', 80.5 parts by weight of component b2, 44.5 parts by weight of toluene, 0.692 parts by weight of component c, and 0.409 parts by weight of component e were mixed well at room temperature, and to the mixture 0.484 parts by weight of component d1 were added to obtain a curing reactive organopolysiloxane composition. The molar ratio (SiH/Vi ratio) of SiH groups in component c to the amount of alkenyl groups in component a was 31.5, while the amount of the platinum metal to the solid fraction was 30 ppm.

Example 2

31.0 parts by weight of component a, 7.75 parts by weight of component a', 84.5 parts by weight of component b2, 43.4 parts by weight of toluene, 0.658 parts by weight of component c, and 0.409 parts by weight of component e were mixed well at room temperature, and to the mixture 0.484 parts by weight of component d1 were added to obtain a curing reactive organopolysiloxane composition. The molar ratio (SiH/Vi ratio) of SiH groups in component c to the amount of alkenyl groups in component a was 32.3, while the amount of the platinum metal to the solid fraction was 30 ppm.

Example 3

28.6 parts by weight of component a, 7.14 parts by weight of component a', 88.7 parts by weight of component b2, 42.3 parts by weight of toluene, 0.623 parts by weight of component c, and 0.409 parts by weight of component e were mixed well at room temperature, and to the mixture 0.484 parts by weight of component d1 were added to obtain a curing reactive organopolysiloxane composition. The molar ratio (SiH/Vi ratio) of SiH groups in component c to the amount of alkenyl groups in component a was 33.1, while the amount of the platinum metal to the solid fraction was 30 ppm.

Example 4

34.6 parts by weight of component a, 90.2 parts by weight of component b2, 41.9 parts by weight of toluene, 0.655 parts by weight of component c, and 0.577 parts by weight of component e were mixed well at room temperature, and to the mixture 0.355 parts by weight of component d1 were added to obtain a curing reactive organopolysiloxane composition. The molar ratio (SiH/Vi ratio) of SiH groups in component c to the amount of alkenyl groups in component a was 28.7, while the amount of the platinum metal to the solid fraction was 22 ppm.

Example 5

27.5 parts by weight of component a, 6.87 parts by weight of component a', 90.5 parts by weight of component b2, 41.8 parts by weight of toluene, 0.552 parts by weight of component c, and 0.409 parts by weight of component e were mixed well at room temperature, and to the mixture 0.355 parts by weight of component d1 were added to obtain a curing reactive organopolysiloxane composition. The molar ratio (SiH/Vi ratio) of SiH groups in component c to the amount of alkenyl groups in component a was 30.5, while the amount of the platinum metal to the solid fraction was 22 ppm.

Example 6

31.6 parts by weight of component a, 10.7 parts by weight of component b1, 85.0 parts by weight of component b2, 39.5 parts by weight of toluene, 0.610 parts by weight of component c, and 0.577 parts by weight of component e were mixed well at room temperature, and to the mixture 0.355 parts by weight of component d1 were added to obtain a curing reactive organopolysiloxane composition. The molar ratio (SiH/Vi ratio) of SiH groups in component c to the amount of alkenyl groups in component a was 29.4, while the amount of the platinum metal to the solid fraction was 22 ppm.

Example 7

30.7 parts by weight of component a, 15.1 parts by weight of component b1, 82.2 parts by weight of component b2, 38.7 parts by weight of toluene, 0.598 parts by weight of component c, and 0.577 parts by weight of component e were mixed well at room temperature, and to the mixture 0.355 parts by weight of component d1 were added to obtain a curing reactive organopolysiloxane composition. The molar ratio (SiH/Vi ratio) of SiH groups in component c to the amount of alkenyl groups in component a was 29.6, while the amount of the platinum metal to the solid fraction was 22 ppm.

Example 8

38.5 parts by weight of component a, 84.9 parts by weight of component b2, 43.3 parts by weight of toluene, 0.762 parts by weight of component c, and 0.577 parts by weight of component e were mixed well at room temperature, and to the mixture 0.423 parts by weight of component d2 were added to obtain a curing reactive organopolysiloxane composition. The molar ratio (SiH/Vi ratio) of SiH groups in component c to the amount of alkenyl groups in component a was 30.1, while the amount of the platinum metal to the solid fraction was 22 ppm.

Example 9

24.5 parts by weight of component a, 10.5 parts by weight of component a', 89.7 parts by weight of component b2, 42.0 parts by weight of toluene, 0.508 parts by weight of component c, and 0.409 parts by weight of component e were mixed well at room temperature, and to the mixture 0.355 parts by weight of component d1 were added to obtain a curing reactive organopolysiloxane composition. The molar ratio (SiH/Vi ratio) of SiH groups in component c to the amount of alkenyl groups in component a was 31.5, while the amount of the platinum metal to the solid fraction was 22 ppm.

Example 10

32.2 parts by weight of component a, 41.3 parts by weight of component b1, 57.0 parts by weight of component b2, 36.2 parts by weight of toluene, 0.618 parts by weight of component c, and 0.577 parts by weight of component e were mixed well at room temperature, and to the mixture 0.355 parts by weight of component d1 were added to SiH groups in component c to the amount of alkenyl groups in component a was 29.3, while the amount of the platinum metal to the solid fraction was 22 ppm.

Comparative Example 1

33.3 parts by weight of component a, 8.33 parts by weight of component a', 83.5 parts by weight of component b2', 41.6 parts by weight of toluene, 0.692 parts by weight of component c, and 0.409 parts by weight of component e were mixed well at room temperature, and to the mixture 0.484 parts by weight of component d1 were added to obtain a curing reactive organopolysiloxane composition. The molar ratio (SiH/Vi ratio) of SiH groups in component c to the amount of alkenyl groups in component a was 31.5, while the amount of the platinum metal to the solid fraction was 30 ppm.

Comparative Example 2

31.0 parts by weight of component a, 7.75 parts by weight of component a', 87.6 parts by weight of component b2', 40.3 parts by weight of toluene, 0.658 parts by weight of component c, and 0.409 parts by weight of component e were mixed well at room temperature, and to the mixture 0.484 parts by weight of component d1 were added to obtain a curing reactive organopolysiloxane composition. The molar ratio (SiH/Vi ratio) of SiH groups in component c to the amount of alkenyl groups in component a was 32.3, while the amount of the platinum metal to the solid fraction was 30 ppm.

Comparative Example 3

28.6 parts by weight of component a, 7.14 parts by weight of component a', 92.0 parts by weight of component b2', 39.0 parts by weight of toluene, 0.623 parts by weight of component c, and 0.409 parts by weight of component e were mixed well at room temperature, and to the mixture 0.484 parts by weight of component d1 were added to SiH groups in component c to the amount of alkenyl groups in component a was 33.1, while the amount of the platinum metal to the solid fraction was 30 ppm.

Comparative Example 4

36.4 parts by weight of component a, 91.0 parts by weight of component b2', 39.3 parts by weight of toluene, 0.807 parts by weight of component c, and 0.577 parts by weight of component e were mixed well at room temperature, and to the mixture 0.484 parts by weight of component d1 were added to obtain a curing reactive organopolysiloxane composition. The molar ratio (SiH/Vi ratio) of SiH groups in component c to the amount of alkenyl groups in component a was 33.7, while the amount of the platinum metal to the solid fraction was 30 ppm.

Comparative Example 5

28.6 parts by weight of component a, 7.14 parts by weight of component a', 92.0 parts by weight of component b2', 39.0 parts by weight of toluene, 0.623 parts by weight of component c, and 0.409 parts by weight of component e were mixed well at room temperature, and to the mixture 0.484 parts by weight of component d1 were added to obtain a curing reactive organopolysiloxane composition. The molar ratio (SiH/Vi ratio) of SiH groups in component c to the amount of alkenyl groups in component a was 33.1, while the amount of the platinum metal to the solid fraction was 30 ppm.

Comparative Example 6

31.6 parts by weight of component a, 10.8 parts by weight of component b1, 88.1 parts by weight of component b2', 36.2 parts by weight of toluene, 0.610 parts by weight of component c, and 0.577 parts by weight of component e were mixed well at room temperature, and to the mixture 0.355 parts by weight of component d1 were added to SiH groups in component c to the amount of alkenyl groups in component a was 29.4, while the amount of the platinum metal to the solid fraction was 22 ppm.

Comparative Example 7

39.7 parts by weight of component a, 86.3 parts by weight of component b2', 96.2 parts by weight of toluene, 0.855 parts by weight of component c, and 0.577 parts by weight of component e were mixed well at room temperature, and to the mixture 0.577 parts by weight of component d2 were added to obtain a curing reactive organopolysiloxane composition. The molar ratio (SiH/Vi ratio) of SiH groups in component c to the amount of alkenyl groups in component a was 32.7, while the amount of the platinum metal to the solid fraction was 30 ppm.

Comparative Example 8

25.5 parts by weight of component a, 10.9 parts by weight of component a', 91.0 parts by weight of component b2', 39.3 parts by weight of toluene, 0.578 parts by weight of component c, and 0.409 parts by weight of component e were mixed well at room temperature, and to the mixture 0.484 parts by weight of component d1 were added to obtain a curing reactive organopolysiloxane composition. The molar ratio (SiH/Vi ratio) of SiH groups in component c to the amount of alkenyl groups in component a was 34.5, while the amount of the platinum metal to the solid fraction was 30 ppm.

Comparative Example 9

32.2 parts by weight of component a, 41.3 parts by weight of component b1, 59.1 parts by weight of component b2', 34.1 parts by weight of toluene, 0.618 parts by weight of component c, and 0.577 parts by weight of component e were mixed well at room temperature, and to the mixture 0.355 parts by weight of component d1 were added to SiH groups in component c to the amount of alkenyl groups in component a was 29.3,

TABLE 2

| | | (B)/(A) | b1/b2 or b1/b2' | Tg (° C.) | Storage Elastic Modulus G' (Mpa) −20° C. | Storage Elastic Modulus G' (Mpa) 25° C. | Pressure-Sensitive Adhesive Force With Respect to PMMA (gf/in) |
|---|---|---|---|---|---|---|---|
| Example | 1 | 1.40 | 0/100 | −41 | 0.045 | 0.028 | |
| | 2 | 1.58 | 0/100 | −29 | 0.068 | 0.025 | |
| | 3 | 1.80 | 0/100 | −15 | 0.203 | 0.025 | |
| | 4 | 1.89 | 0/100 | −10 | 0.505 | 0.029 | 1870 |
| | 5 | 1.91 | 0/100 | −12 | 0.347 | 0.024 | 2200 |
| | 6 | 2.17 | 10/90 | 12 | 3.70 | 0.051 | 2370 |
| | 7 | 2.26 | 14/86 | 18 | 5.50 | 0.065 | 2720 |
| | 8 | 1.60 | 0/100 | −27 | 0.099 | 0.033 | 1150 |
| | 9 | 1.86 | 0/100 | −12 | 0.247 | 0.021 | 2150 |
| | 10 | 2.11 | 39.1/60.9 | 31.5 | 12.8 | 0.292 | 2460 |
| Comparative Example | 1 | 1.40 | 0/100 | −31 | 0.068 | 0.031 | |
| | 2 | 1.58 | 0/100 | −20 | 0.156 | 0.029 | |
| | 3 | 1.80 | 0/100 | −7 | 0.577 | 0.028 | |
| | 4 | 1.75 | 0/100 | −12 | 0.408 | 0.033 | 1490 |
| | 5 | 1.80 | 0/100 | −7 | 0.593 | 0.028 | 1910 |
| | 6 | 2.17 | 10/90 | 18 | 5.24 | 0.064 | 2340 |
| | 7 | 1.52 | 0/100 | −25 | 0.157 | 0.040 | 1080 |
| | 8 | 1.75 | 0/100 | −11 | 0.437 | 0.030 | 1880 |
| | 9 | 2.11 | 39.1/60.9 | 34.2 | 14.8 | 0.478 | 2330 |

TABLE 3

| (B)/(A) | R |
|---|---|
| 1.5 | 0.897 |
| 1.7 | 0.920 |
| 1.9 | 0.936 |
| 2.1 | 0.948 |

As shown in Table 3, the values of R, which are values obtained by dividing Tg+120 according to the examples and Tg'+120 according to the comparative examples, were all less than 1.0 in the above range of (B)/(A)=1.5 to 2.1. Note that for Example 10 and Comparative Example 9, the (B)/(A) ratio was the same at 2.11; therefore, the value of R was 0.982, which was also less than 1.0.

Furthermore, as shown in Table 2, when the (B)/(A) ratio was adjusted to provide the same Tg when using MQ resin (Mw less than 4000) serving as component b2 as when using a resin (Mw: 4070) serving as component b2' (the (B)/(A) ratio can be obtained from FIG. 1), the pressure-sensitive adhesive strength was higher when the MQ resin serving as component b2 was used. This applies to Example 4 for Comparative Example 4, Example 5 for Comparative Example 5, Example 7 for Comparative Example 6, Example 8 for Comparative Example 7, and Example 9 for Comparative Example 8. Furthermore, the pressure-sensitive adhesive strength of Example 10 was higher than that of Comparative Example 9, even though the Tg was slightly lower in Example 10.

From the above, by using component (b2) of the present invention, a lower Tg of the pressure-sensitive adhesive layer can be designed for the same (B)/(A) ratio, and a higher pressure-sensitive adhesive strength can be achieved in comparison with a pressure-sensitive adhesive layer with the same or similar Tg.

INDUSTRIAL APPLICABILITY

Applications of a composition obtained or designed by the present invention and a cured product obtained by curing the same are in no way limited to the disclosure above, with a pressure-sensitive adhesive film provided with a cured product obtained by curing the composition capable of being used in various display devices for displaying characters, symbols, and images such as television receivers, computer monitors, monitors for personal digital assistants, monitoring monitors, video cameras, digital cameras, mobile phones, personal digital assistants, displays for instrument panels of automobiles or the like, displays for instrument panels of various equipment, devices, and instruments, automatic ticket machines, automated teller machines, on-board display devices, and on-board transmission screens. The surface shape of such a display device may be a curved shape or a bowed shape rather than a flat surface, with examples thereof including curved displays or curved transmission screens used in automobiles (including electric vehicles), aircraft, or the like, in addition to various flat panel displays (FPDs). Further, these display devices can display icons for executing functions or programs on a screen or display, notification indicators of e-mail, programs, or the like, and operation buttons for various devices such as car navigation devices, audio devices, and air conditioning devices, with touch panel functions enabling input operations capable of being added by touching these icons, notification indicators, or operation buttons with a finger. Application thereof is possible as a device for CRT displays, liquid crystal displays, plasma displays, organic EL displays, inorganic EL displays, LED displays, surface electrolytic displays (SEDs), field emitting displays (FEDs), and other display devices, or touch panels using the display devices. Moreover, the cured product obtained by curing the composition has excellent adhesion and viscoelastic properties, enabling the use thereof as a film-like or sheet-like member which is a member for transducers such as a membrane for speakers (including a sensor, speaker, actuator, and the like), in addition to also being capable of being used as a sealing layer or adhesive layer used in a secondary battery, fuel cell, or solar cell module.

The invention claimed is:

1. A pressure-sensitive adhesive layer forming organopolysiloxane composition, comprising the following components:

(A) a chain organopolysiloxane having alkenyl groups in numbers greater than 1 on average in a molecule;

(B) an organopolysiloxane or a mixture thereof, containing the following components (b1) and (b2) at a mass ratio of 1:99 to 0:100:

(b1) an organopolysiloxane resin, where the total amount of hydroxyl groups and hydrolyzable groups with regard to all silicon atoms in a molecule is 9 mol % or less, and the weight average molecular weight (Mw) measured in terms of standard polystyrene by gel permeation chromatography (GPC) using toluene is 5500 or more, and (b2) an organopolysiloxane resin, where the total amount of hydroxyl groups and hydrolyzable groups with regard to all silicon atoms in a molecule is 9 mol % or less, and the weight average molecular weight (Mw) measured in terms of standard polystyrene by gel permeation chromatography (GPC) using toluene is less than 4000;

(C) an organohydrogenpolysiloxane having at least two Si—H bonds in a molecule; and (D) a hydrosilylation reaction catalyst;

wherein the value of [Tg+120]/[Tg'+120] is less than 1.0, when Tg (° C.) represents the glass transition temperature of a pressure-sensitive adhesive layer obtained by curing the composition, and Tg' (° C.) represents the glass transition temperature of a pressure-sensitive adhesive layer obtained by curing a composition identical to the organopolysiloxane composition, except that the component (b2) is substituted with an organopolysiloxane resin with a weight average molecular weight (Mw) of 4000 or more, measured by the same method as the component (b2), and the mass ratio of the component (B) to the component (A) is the same.

2. The pressure-sensitive adhesive layer forming organopolysiloxane composition according to claim 1, wherein the component (B) is an organopolysiloxane resin or mixture thereof, containing the component (b1) and the component (b2) at a mass ratio of 60:40 to 0:100, and the weight average molecular weight of the component (b2) is in a range of 1000 to 3900.

3. The pressure-sensitive adhesive layer forming organopolysiloxane composition according to claim 1, wherein the mass ratio [(B)/(A)] of the component (B) to the component (A) is in a range of 1.0 to 2.5, and Tg is in a range of −70° C. to +45° C.

4. The pressure-sensitive adhesive layer forming organopolysiloxane composition according to claim 1, wherein at least a portion of the component (A) is (A1) an alkenyl group-containing organopolysiloxane having a viscosity of 100,000 mPa·s or more at 25° C. or having a plasticity in a range of 50 to 200 as measured in accordance with a method as prescribed in JIS K6249, and is a chain organopolysiloxane in which the amount of alkenyl groups calculated as vinyl ($CH_2$=CH) groups is in a range of 0.005 to 0.400 mass %, the component (B) is an organopolysiloxane resin or a mixture thereof essentially containing a $R_3SiO_{1/2}$ unit (where R represents a monovalent organic group and 90 mol % or more of R is an alkyl group or phenyl group with 1 to 6 carbon atoms; M unit) and $SiO_{4/2}$ (Q unit), the amount of the component (C) is an amount such that the ratio (molar ratio) of the substance amount of SiH groups in the component (C) to the total substance amount of the alkenyl groups in the components (A) and (B) is 0.1 to 100, the amount of the component (D) is such that the amount of platinum-based metals in a solid fraction of the composition is in a range of 0.1 to 200 ppm, and an organopolysiloxane resin other than the component (B) is essentially not included.

5. The pressure-sensitive adhesive layer forming organopolysiloxane composition according to claim 1, wherein the amount of the component (C) is an amount such that the ratio (molar ratio) of the substance amount of SiH groups in the component (C) to the total substance amount of the alkenyl groups in the components (A) and (B) is in a range of 11 to 60.

6. The pressure-sensitive adhesive layer forming organopolysiloxane composition according to claim 1, further comprising (A') a chain organopolysiloxane without an alkenyl group and a silicon atom-bonded hydrogen atom in a molecule.

7. The pressure-sensitive adhesive layer forming organopolysiloxane composition according to claim 1, wherein the pressure-sensitive adhesive strength of a pressure-sensitive adhesive layer with a thickness of 50 μm obtained by curing the organopolysiloxane composition, as measured at a tensile rate of 300 m/min using a 180° peeling test method in accordance with JIS Z 0237 for a 2 mm thick polymethyl methacrylate sheet, is in a range of 360 to 4000 gf/inch.

8. The pressure-sensitive adhesive layer forming organopolysiloxane composition according to claim 1, wherein the pressure-sensitive adhesive layer exhibits a pressure-sensitive adhesive strength, as measured at a tensile rate of 300 m/min using a 180° peeling test method in accordance with JIS Z 0237 for a 2 mm thick polymethyl methacrylate sheet, greater than that of a comparative pressure-sensitive adhesive layer obtained by curing a pressure-sensitive adhesive layer forming organopolysiloxane composition identical to the organopolysiloxane composition, except that the component (b2) is omitted and an organopolysiloxane resin having a weight average molecular weight (Mw) as measured by the same method as the component (b2) of 4000 or more is used.

9. A pressure-sensitive adhesive layer obtained by curing the pressure-sensitive adhesive layer forming organopolysiloxane composition according to claim 1.

10. A laminate body, comprising a pressure-sensitive adhesive layer obtained by curing the pressure-sensitive adhesive layer forming organopolysiloxane composition according to claim 1, on a film substrate.

11. The laminate body according to claim 10, wherein a release layer for the pressure-sensitive adhesive layer is provided on the film substrate.

12. The laminate body according to claim 10, further comprising: a first release layer formed on the film substrate; and a second release layer laminated on the pressure-sensitive adhesive layer.

13. An elastic pressure-sensitive adhesive member obtained by curing the pressure-sensitive adhesive layer forming organopolysiloxane composition according to claim 1.

14. An electronic apparatus or electrical device, comprising the elastic pressure-sensitive adhesive member according to claim 13.

15. A method of forming a pressure-sensitive adhesive layer by curing the pressure-sensitive adhesive layer forming organopolysiloxane composition of claim 1.

* * * * *